(12) United States Patent
Peoples (10) Patent No.: US 10,765,107 B2
(45) Date of Patent: Sep. 8, 2020

(54) REMOTE CONTROLLED DUCK DECOY WITH MECHANICAL DUCK CALL

(71) Applicant: Paul Peoples, Toney, AL (US)

(72) Inventor: Paul Peoples, Toney, AL (US)

(*) Notice: Subject to any disclaimer, the term of this patent is extended or adjusted under 35 U.S.C. 154(b) by 207 days.

(21) Appl. No.: 16/028,775

(22) Filed: Jul. 6, 2018

(65) Prior Publication Data

US 2020/0008418 A1 Jan. 9, 2020

(51) Int. Cl.
*A01M 31/06* (2006.01)
*A01M 31/00* (2006.01)

(52) U.S. Cl.
CPC .......... *A01M 31/004* (2013.01); *A01M 31/06* (2013.01)

(58) Field of Classification Search
CPC .................................................. A01M 31/06
USPC .......................................................... 43/2, 3
See application file for complete search history.

(56) References Cited

U.S. PATENT DOCUMENTS

| | | | |
|---|---|---|---|
| 3,034,245 A | 5/1962 | Lynch | |
| 4,056,890 A * | 11/1977 | Dembski | A01M 31/06 43/3 |
| 5,377,439 A | 1/1995 | Roos et al. | |
| 5,566,491 A | 10/1996 | Phillips | |
| 5,930,936 A | 8/1999 | Parr et al. | |
| 6,053,793 A * | 4/2000 | Green | A01M 31/004 446/188 |
| 6,079,140 A | 6/2000 | Brock, IV | |
| 6,339,893 B1 * | 1/2002 | Solomon | A01M 31/06 43/3 |
| 8,250,801 B2 * | 8/2012 | Elpi | A01M 31/06 43/2 |
| 9,565,851 B2 * | 2/2017 | Peoples | A01M 31/004 |
| 2009/0188148 A1 * | 7/2009 | Orris | A01M 31/06 43/3 |
| 2019/0037830 A1 * | 2/2019 | Cagle | A01M 31/06 |

* cited by examiner

*Primary Examiner* — David J Parsley
(74) *Attorney, Agent, or Firm* — Cynthia R. Wright (57) ABSTRACT

The invention herein is a duck-shaped decoy that floats upon a body of water. The decoy may also be formed into the shape of a goose, wild turkey, or other fowl. The decoy includes a mechanism that produces a motion that simulates the motion of a wild duck, or other fowl. The decoy also includes a mechanical can call activating device that mechanically manipulates a can call producing a noise that attracts ducks, or other fowl.

7 Claims, 11 Drawing Sheets

REMOTE CONTROLLED DUCK DECOY WITH MECHANICAL DUCK CALL

CROSS-REFERENCE TO RELATED APPLICATIONS

This application does not claim priority to any patent application.

DISCLOSURE REGARDING PRIOR DISCLOSURES BY THE INVENTOR OR A JOINT INVENTOR

The inventor has not disclosed this invention prior to the filing of this non provisional application.

BACKGROUND OF THE INVENTION

(1) Field of the Invention

This device is a mechanical duck call that comprises a duck-shaped duck decoy wherein the duck decoy encloses a device that mechanically operates a can call. Alternately, the device could be molded into the shape of a goose, wild turkey, or other fowl. A user installs a can call that produces a duck attracting sound inside the belly, or internal cavity, of the device. Alternatively, a user could install a can call that produces a sound that attracts a goose, wild turkey, or other fowl. Next, the user places the device on a pond, lake or other water feature. The user operates a remote control that causes the device to manipulate the installed can call so that it produces a duck attracting noise. The remote control may also control the movement of the duck decoy upon the water causing the duck decoy to shake emulating the movement of a wild duck so that the device attracts wild ducks.

(2) Disclosure of the Prior Art

A number of duck decoy devices that produce duck-attracting noises or duck-attracting movement are known in the prior art. This is the first device that enables a user to produce both duck-attracting noises and duck-attracting movement remotely with the same device.

Brock, IV (U.S. Pat. No. 6,079,140) discloses a frame device that a user attaches one or more duck decoys before placing the frame device into a body of water. The frame is suspended below the surface of the water allowing the decoys to float on top of the surface of the water. A motor and controller are coupled to the frame so that the frame can be moved and the ducks can be repositioned from floating on their breasts to floating face down so that they mimick wild ducks feeding. This device does not allow for the production of duck-attracting noises. The device is cumbersome and difficult to maneuver. This device requires a user to expend substantial time and energy placing the device in the water so that all the decoys are in the correct orientation for proper operation of the device which subjects the user to extended exposure to water before operating the device. Additionally, the frame device is subject to becoming entangled in water lilies, sticks, saw grass, and other items that may be in the body of water.

Roos et al. discloses a remote controlled duck that includes a floating decoy body resembling a game bird. A receiver is responsive to commands from a transmitter and provides electrical control signals to a propulsion mechanism that moves the decoy body along the surface of the water. This device does not produce bird or duck-attracting noises.

Lynch (U.S. Pat. No. 3,034,245) discloses a duck decoy that produces a duck-attracting noise, but the device can not be operated remotely. The device of Lynch includes a decoy duck body with a whistle-type duck call embedded in the mouth of the duck decoy head. The device includes a hose connected to the duck call that extends from the duck decoy head through the decoy duck body. The hose extends from the decoy duck body a sufficient length to enable a user to blow air through the hose to create a noise from the duck call. This device requires that a user be very close to the decoy, which will frighten away fowl and may cause the user to maintain an uncomfortable position laying or crouching next to a body of water.

A decoy device that remotely operates a duck call will allow a user to place the decoy onto a body of water and remotely control the production of both duck-attracting noises and duck-attracting movement with a handheld remote control. A remote controlled device with these features will enable hunters to be more successful. The device herein does this. This device allows a hunter to be safely away from a body of water while operating a duck decoy upon the body of water so that the duck decoy produces both duck-attracting noises and duck-attracting movement.

BRIEF SUMMARY OF THE INVENTION

This device comprises a duck decoy body that includes a mechanism that produces both duck-attracting noises and duck-attracting movement remotely allowing a user to effectively attract ducks and other waterfowl for hunting or observation. The device allows a can call that produces a duck or fowl noise to be reversibly attached. The device manually manipulates the can call to create both duck-attracting noises and duck-attracting movement. A number of federal and state laws govern the hunting and the attraction of wild fowl. Most of these laws do not permit wild migratory birds, such as ducks, to be attracted by electronic means. This device incorporates a mechanical means to produce a duck-attracting noise.

BRIEF DESCRIPTION OF THE DRAWINGS

The invention is described in detail below with reference to the appended drawings. FIGS. 1 through 10 depict the Remote Controlled Duck Decoy with Mechanical Duck Call. In the Figures:

DETAILED DESCRIPTION OF THE INVENTION

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, etc., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an embodiment in the present disclosure, can be, but not necessarily, references to the same embodiment; and, such references mean at least one of the embodiments.

Reference in this specification to "one embodiment' or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same term can be said in more than one way.

Consequently, alternative language and synonyms may be used for any one or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

The device comprises a bird decoy body that may be formed into the shape of a duck, goose, wild turkey, or other fowl. The decoy body is made of a material that allows it to float when placed onto the surface of a body of water. The decoy body contains a shaker mechanism that allows the device to shake when placed on a body of water stimulating the movement of a duck, or other fowl, upon the water. The decoy body also contains a mechanical can call activating mechanism that operates a can call contained within the decoy body producing a duck-attracting noise. And, the decoy body includes a remote control mechanism that enables a user to activate both the shaker mechanism and the mechanical can call activating mechanism from afar. The remote control mechanism controls the movement of the bird decoy body directing it on the surface of the water to the desired location. A rudder (not shown) may be included with the bird decoy body to steer the decoy along the surface of the body of water. A user positioned away from the bird decoy body manipulates a remote control device causing the decoy to move and to make duck-attracting noises.

Figure 1:
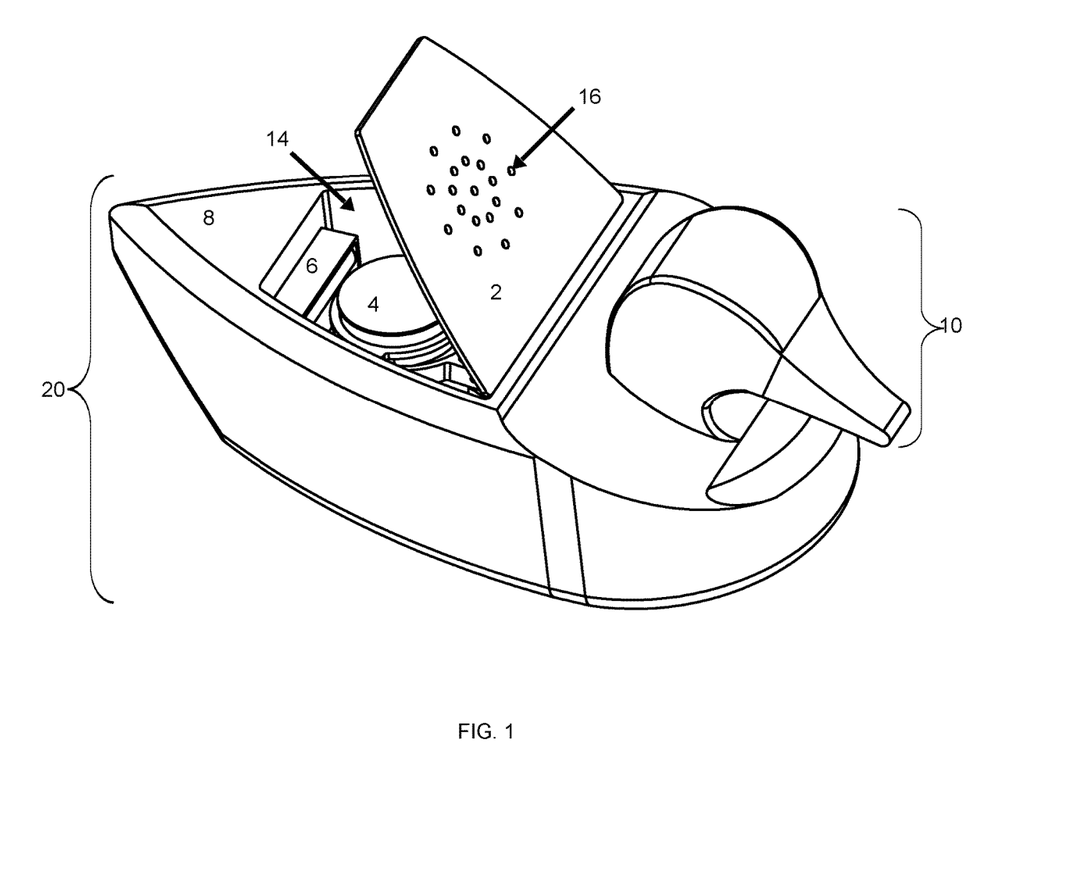
FIG. 1 depicts an angled exterior, side view of the device with the lid of the device ajar revealing the internal compartment of the device.

FIG. 1 depicts an exterior, angled side view of the device herein. The decoy body 20 includes head 10 that is formed into the shape of a duck, or other fowl, head. Decoy body 20 is formed into the shape of a duck or other fowl. Decoy body 20 may be composed of any material that allows the device to float when placed upon a body of water. Decoy body 20 may be formed from polyethylene with either a single piece mold or a multi piece mold. Decoy body 20 includes lid 2. Lid 2 may include holes 16 that allow the movement of sound produced within the internal cavity 14 of decoy body 20 to be emitted from decoy body 20 to the area surrounding decoy body 20. Lid 2 closes upon decoy body 20 so that it rests in a position aligned with body top 10. Battery pack 6 secures batteries that power the shaker mechanism and the mechanical can call activating mechanism in FIG. 1. Detachable can call 4 is shown secured within internal cavity 14 of decoy body 20.

Figure 2:
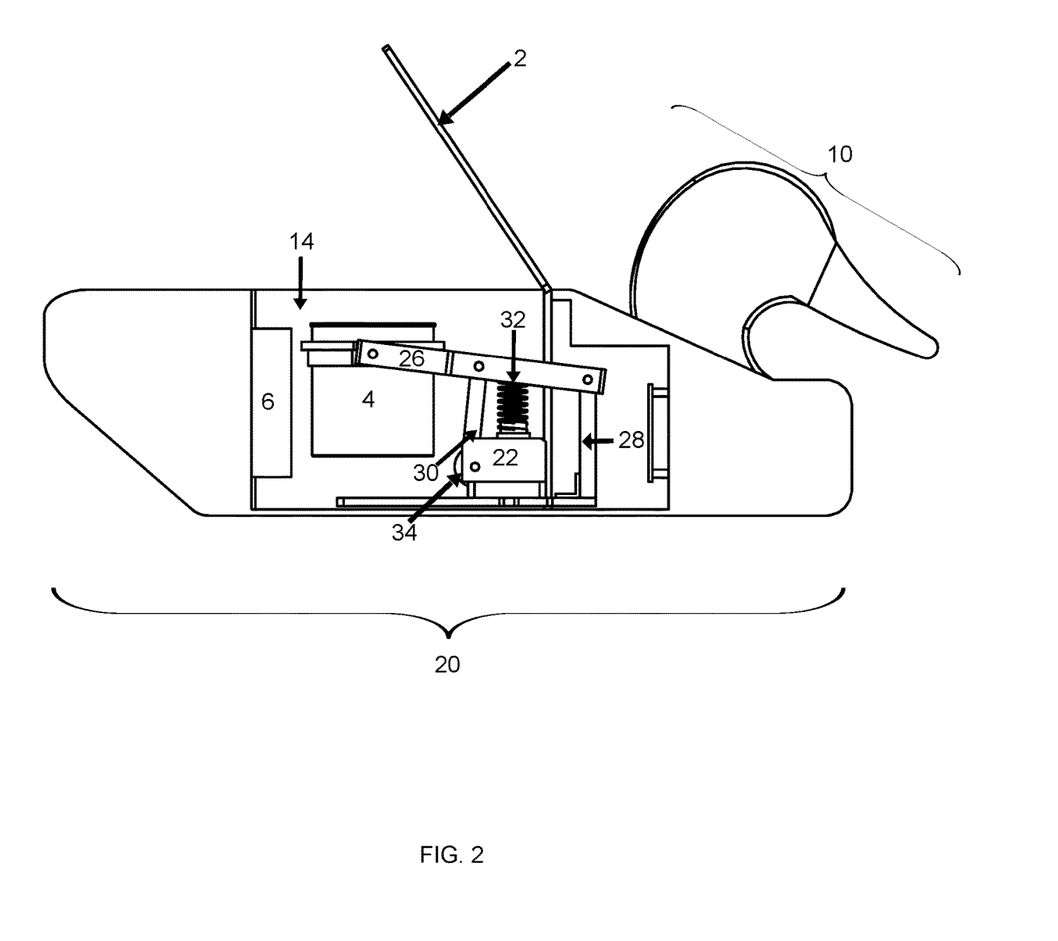
FIG. 2 depicts a mid-sectional view of the device.

FIG. 2 depicts a mid-sectional view of the device. Lid 2 is positioned so that a user has access to internal cavity 14. Head 10 depicts the shape of a duck head. Head 10 may feature coloration that attracts ducks, or other fowl, to decoy body 20. Decoy body 20 may be colored so that the device may resemble a live fowl. Battery pack 6 encloses the requisite number of batteries to power the device. Can call 4 is installed in the mechanical can call activating mechanism. The following components of the mechanical can call activating mechanism depicted in FIG. 2 include: lifter arm 26, spring 32, pivot base 28, lift wheel 34, and lifter 30. Lifter 30 includes a magnet that is embedded within it and can not be seen in the figures. Lifter 30 magnet allows the position of lifter 30 to be tracked during shaker motor 22 operation. Shaker mechanism comprises shaker motor 22 which vibrates causing decoy body 20 to vibrate gently creating movement that simulates the movement of a duck, or other fowl. Shaker motor 22 may include both a mechanism that causes decoy body 20 to shake and power other functions of the device, such as propelling the device along the top of a body of water and powering the mechanical can call activating mechanism.

Figure 3:
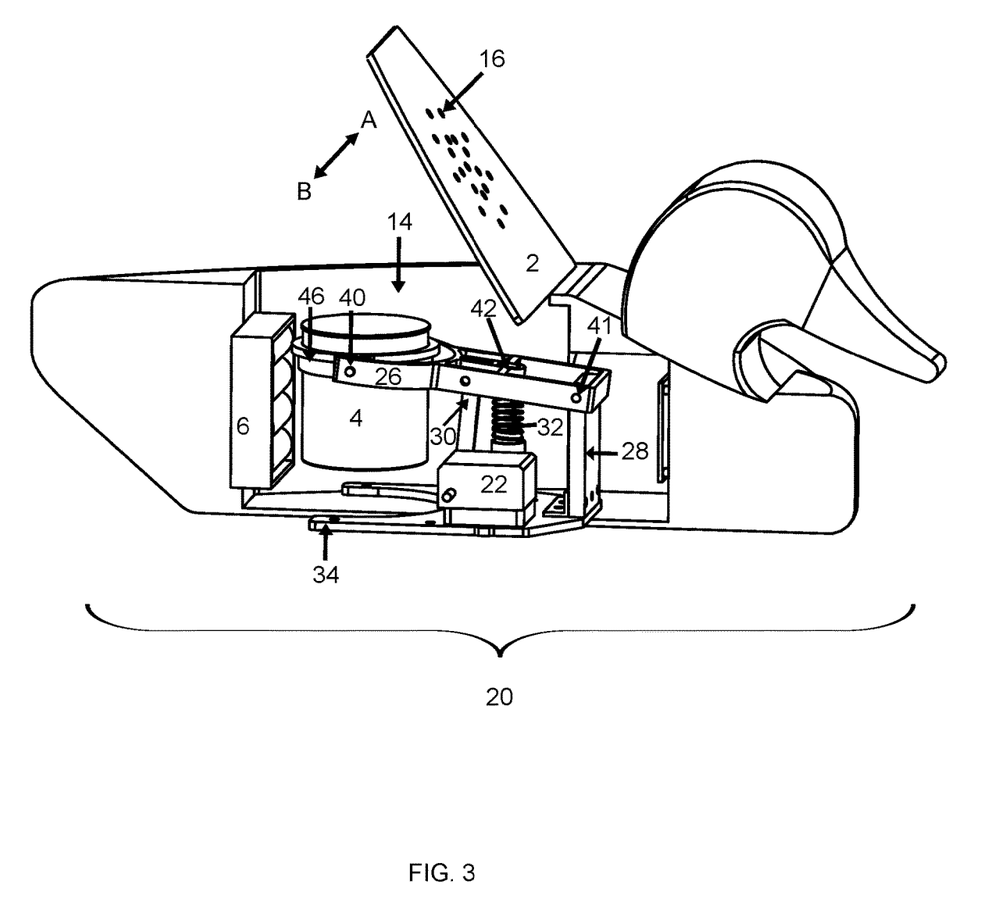
FIG. 3 depicts an angled, sectional view of the device.

An angled, sectional view of the device is illustrated in FIG. 3. Lid 2 including holes 16 is shown. Lid 2 moves in the "A" or "B" direction to allow a user to open and close the lid, respectively, relative to decoy body 20. Lid 2 should be moved in direction "B" to prohibit access to internal cavity 14. Lid 2 should be closed prior to placing decoy body 2 on a body of water. Battery pack 6 is attached to decoy body 20. Lifter arm 26 and can call ring 46 firmly secure can call 4 onto the mechanical can call activating mechanism. Both lifter arm 26 and can call ring 46 may be composed of plastic, aluminum, or other suitable material that is lightweight and resistant to rust. Can call pivot pin 40 allows can call 4 to pivot as lifter arm 26 moves relative to pivot base 28 and pivot lifter platform 34. Pivot pin 41 allows lifter arm 26 to move relative to pivot base 28. Both pivot base 28 and lifter platform 34 remain stationary while can call 4 moves. The up and down movement of can call 4 produces a duck, or other fowl, attracting noise. Lifter 30 may be formed of aluminum or other rust-resistant material. Lifter 30 lifts lifter arm 26 causing the movement of can call 4. Spring 32 lifts lifter arm 26 upward towards lid 2 via lifter 30, while shaker motor 22 drives lifter arm 26 downward relative to lifter platform 34. Main lift pin 42 secures lifter arm 26 onto lifter 30 while allowing lifter arm 26 to pivot relative to lifter 30.

Figure 4:
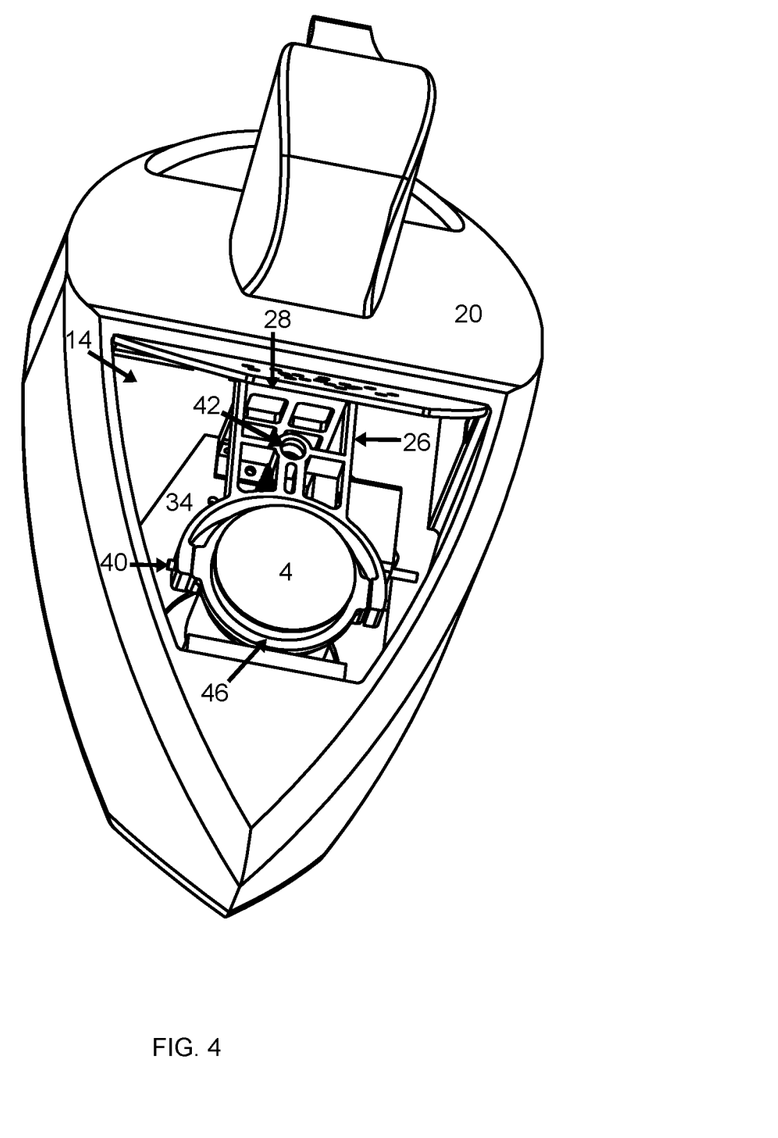
FIG. 4 shows an angled top view of the device with the lid removed.

An angled, top view of the device with lid 2 removed is shown in FIG. 4. Lifter platform 34 comprises the bottom of internal cavity 14. Can call 4 is secured tightly onto can call ring 46 and lifter arm 26 via can call pivot pin 40. The top of pivot base 28 is shown adjacent to lifter arms 26. The top of lift pin 42 is shown.

Figure 5:
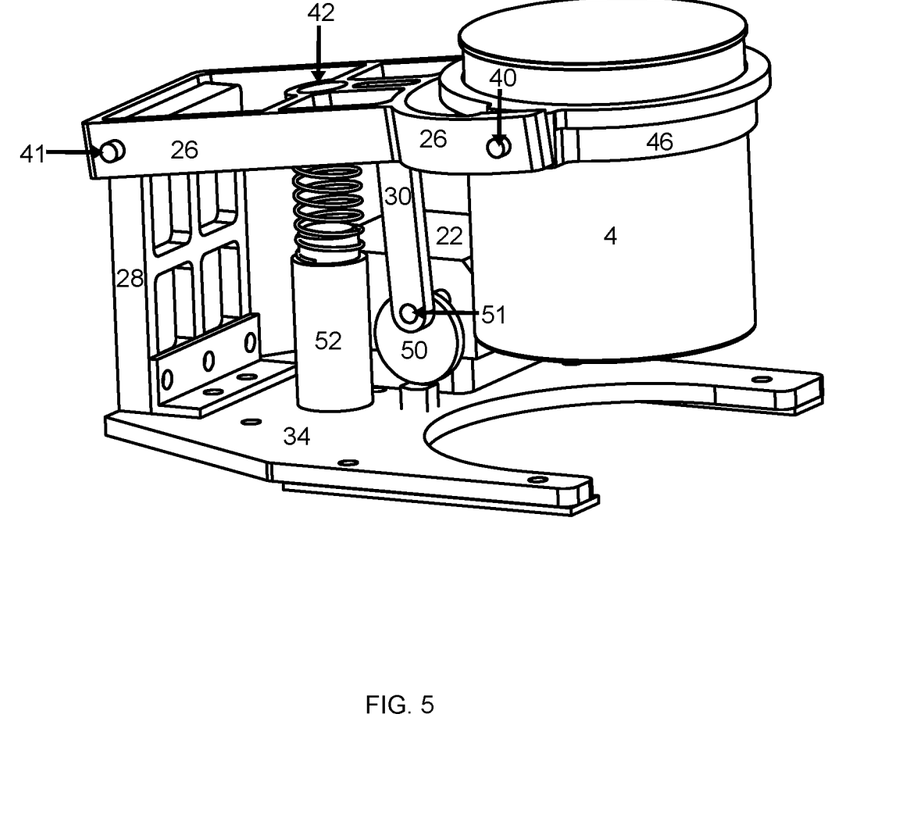
FIG. 5 depicts the mechanism contained within the internal cavity of the device.

FIG. 5 illustrates the mechanical can call activating mechanism separated from decoy body 20 (not shown). Can call 4 is secured onto can call ring 46 and lifter arm 26 via can call pivot pin 40. Can call 4 is depicted at its greatest distance from lifter platform 34. Pivot base 28 is secured onto lifter platform 34. Lifter arm 26 is secured onto pivot base 28 via pivot pin 41. Lift pin 42 secures lifter arm 26 onto lifter 30 and forms a means to secure the top of spring 32 onto lifter arm 26 during movement of lifter 30. The use of spring 32 decreases wear on shaker motor 22 because shaker motor 22 is not required to lift lifter arm 26. The spring action of spring 32 lifts lift arm 26 and can call 4 into position after each pivot/stroke about pivot base 28. Spring holder 52 secures the bottom of spring 32 onto lifter platform 34. Shaker motor 22 powers the movement of lifter 30 via the rotation of lift wheel 50. The movement of lifter 30 causes decoy body 20 to move about the surface of the body of water simulating the movement of a duck, or other fowl. Lifter 30 is coupled to lift wheel 50 via lift wheel pin 51.

Figure 6:
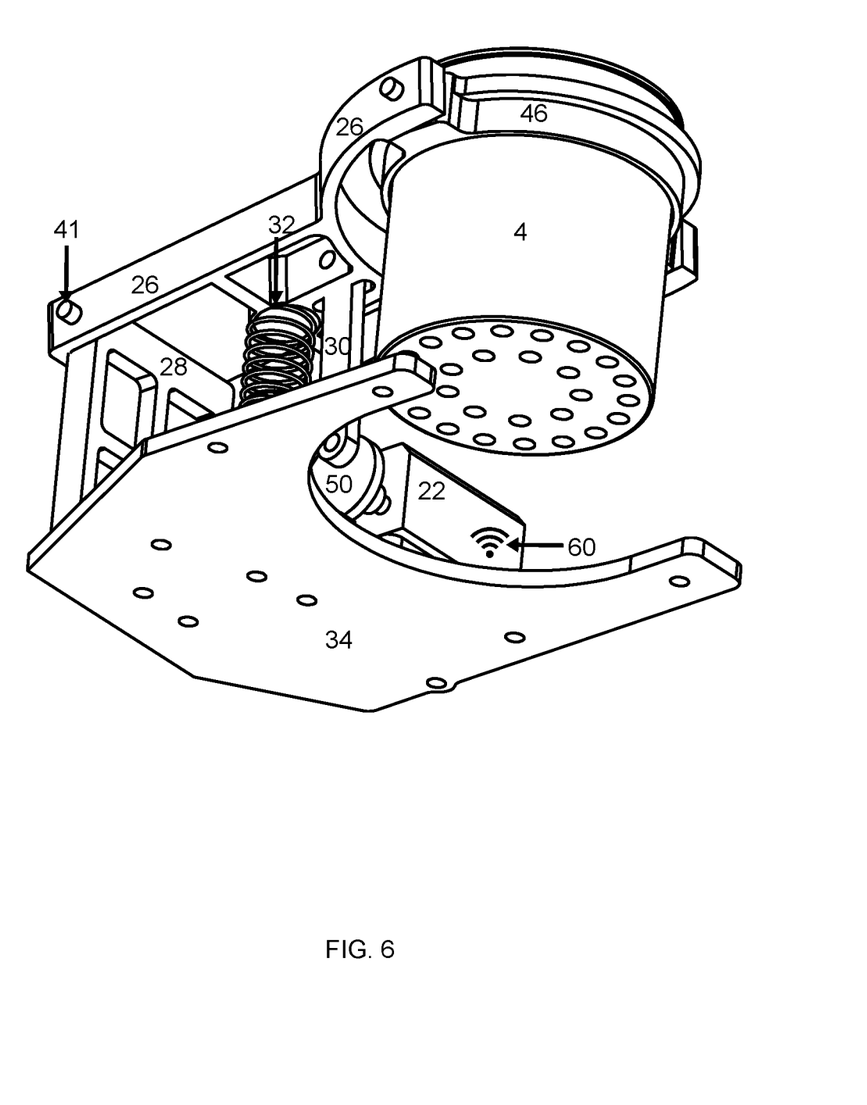
FIG. 6 shows an angled bottom view of the internal mechanism of the device.

FIG. 6 illustrates a angled, bottom view of the device. Lifter platform 34 anchors shaker motor 22 and pivot base 28. Remote control receiver 60 receives commands from a user via a handheld remote control (not shown). Remote control receiver 60 receives a user's command and transmits that command to shaker motor 22. Upon receipt of the correct user command by remote control receiver 60, shaker motor 22 shakes to simulate the movement of a duck, or other fowl, and causes lifter 30 to move upward relative to lifter platform 34 to cause lift wheel 50 to move lift arm 26, which causes duck-attracting noises to be produced. Lift wheel 50 moves in a circular path when activated by shaker motor 22. The circular movement of lift wheel 50 causes lifter 30 to move upward and downward relative to lifter platform 34. Spring 32 moves in response to the movement of lift arm 26, which moves relative to pivot base 28 via rotation about pivot pin 41. Can call 4 is held onto lift arm 26 via can call ring 46.

Figure 7:
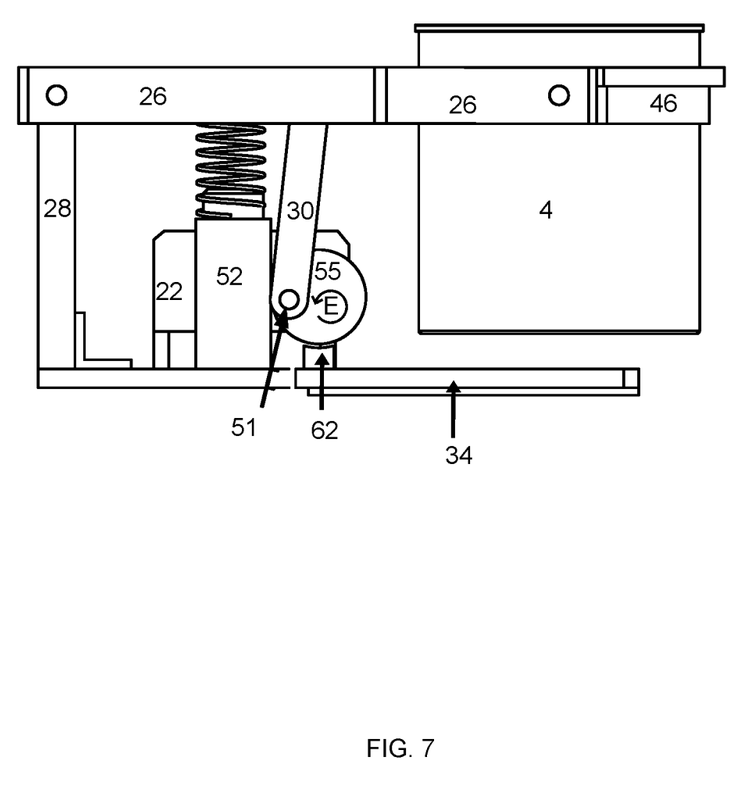
FIG. 7 illustrates a side view of the internal mechanism of the device wherein the can call is in the off position.

A side view of the mechanical can call activating mechanism is illustrated in FIG. 7. FIG. 7 depicts the device in the "off" position. Note that in the off position lift arm 26 is parallel to lifter platform 34 and perpendicular to pivot base 28. Lifter 30 is positioned to the side of lift wheel 55 so that it is at the closest possible position relative to spring holder 52. Spring holder 52 creates a base for the attachment of spring 32. Spring base 52 secures spring 32 onto platform base 34 while spring 32 increases and decreases in length while stretching and shrinking, respectively. Shaker motor 22 is not moving lifter 30 in this position, and can call 4 does not emit any noise. Lift wheel 55 is stationary relative to sensor 62. Sensor 62 includes a sensor that can detect the location of the magnet embedded within lifter 30.

Figure 8:
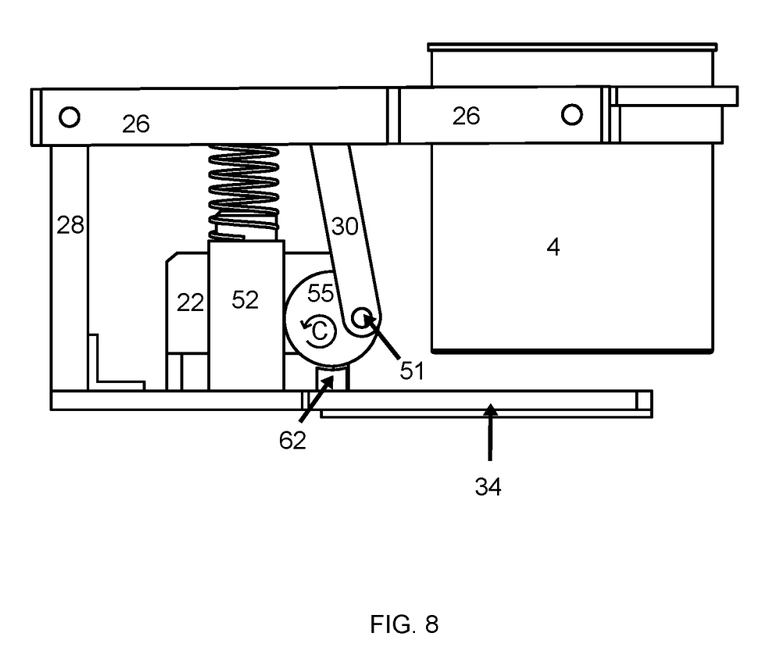
FIG. 8 illustrates a side view of the internal mechanism of the device wherein the can call is in the start position.

FIG. 8 illustrates the mechanical can call activating mechanism in the "start" position. Shaker motor 22 is turned "on" and is receiving battery power. Lift wheel 55 has moved lifter 30 in the "C" direction. The movement of lifter 30 in the "C" direction about lift wheel pin 51 is detected by sensor 62. Sensor 62 is activated by shaker motor 22 to detect magnetism from the magnet embedded within lifter 30. Spring 32 is stationary. Lifter arm 26 is parallel to lifter platform 34 and perpendicular to pivot base 28.

Figure 9:
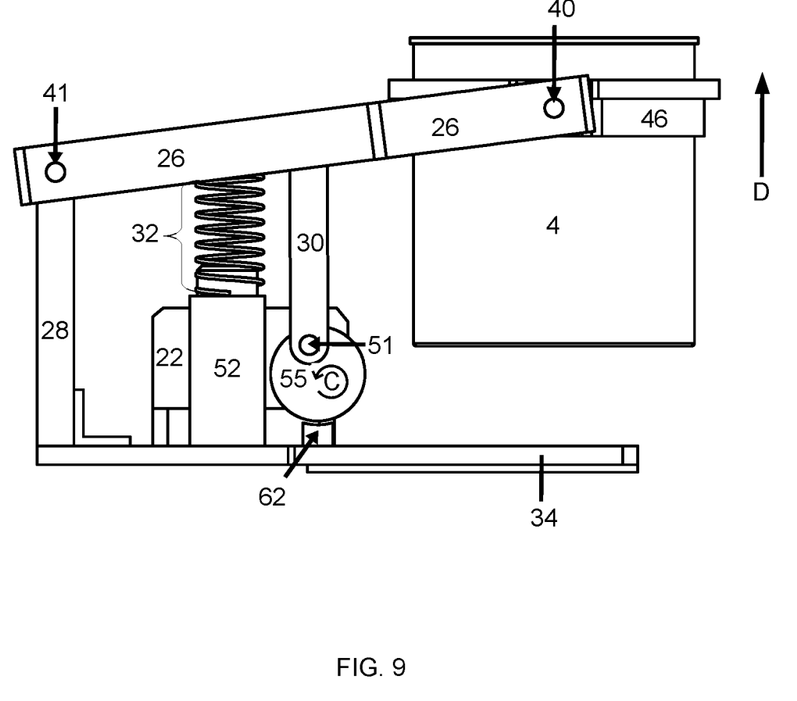
FIG. 9 shows a side view of the internal mechanism of the device wherein the can call is in the spring activated position.

The mechanical can call activating mechanism is illustrated in the "spring activated" position in FIG. 9. Lift wheel 55 rotates in the "C" direction about lift wheel pin 51, causing lifter 30 to move relative to lifter platform 34 allowing spring 32 to move relative to spring holder 52 which stretches the length of spring 32 to its maximum length. The stretching of spring 32, which may be a compression spring, causes lifter arm 26 to move relative to lifter platform 34 so that lifter arm 26 is no longer parallel to lifter platform 34. Lifter arm 26 moves by pivoting about pivot base 28 at pivot pin 41 and about can call ring 46 at can call pivot pin 40. This movement of lifter arm 26 causes can call 4 to move in the "D" direction away from lifter platform 34. Note that can call 4 is positioned at its greatest distance from lifter platform 34 in the "spring activated" position Sensor 62 detects the position of lifter 30, which has moved in the "C" direction and is perpendicular to lifter platform 34 in the "spring activated" position.

Figure 10:
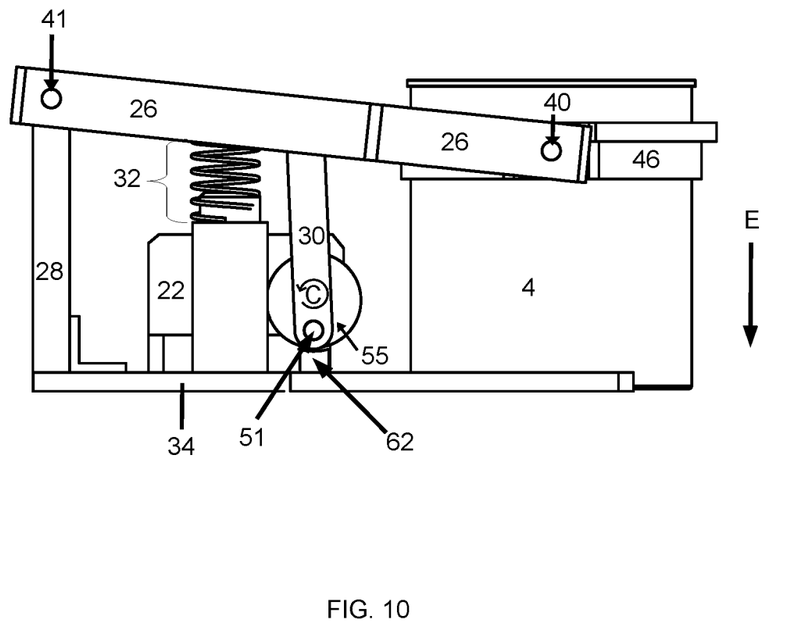
FIG. 10 illustrates a side view of the internal mechanism of the device wherein the can call is in the lifter activated position.

FIG. 10 illustrates the device in the "lifter activated" position. Shaker motor 22 causes lift wheel 55 to rotate about lift wheel pin 51 in the "C" direction pulling lifter 30 downward towards lifter platform 34 and moving can call 4 the "E" direction towards lifter platform 34. Can call 4 is positioned on top of lifter platform 34. Lift arm 26 is rotated relative to pivot base 28 about pivot pin 41. Lift arm 26 is also rotated relative to can call 4 about can call pivot pin 40. Spring 32 is compressed to its shortest length. Sensor 62 detects that lifter 30 is at its closest position to lifter platform 34.

Next, the mechanical can call activating mechanism may return to the "off" position depicted in FIG. 7 if a user turns the device "off". Instead, the device may return to the start position depicted at FIG. 8 so that the steps depicted at FIGS. 9 and 10 may be repeated until such time as the device is turned "off" and restored to the position depicted in FIG. 7.

The movement of the device from FIG. 8 through FIGS. 9 and 10 causes can call 4 to produce duck-attracting noises, and causes the device to move in a manner that simulates a duck, or other fowl.

Figure 11:
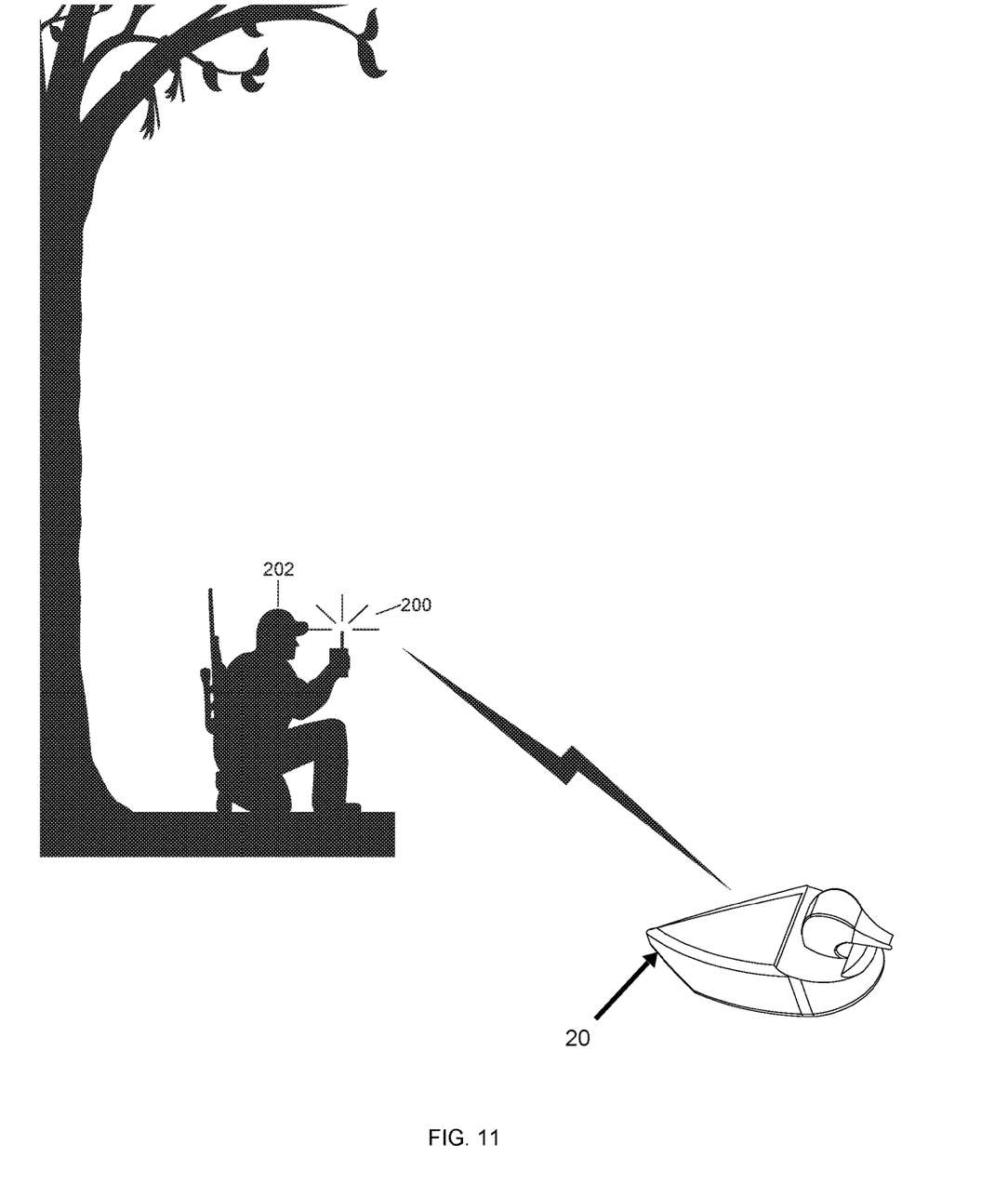
FIG. 11 illustrates a user holding a remote control and manipulating the device herein.

FIG. 11 depicts a hunter/user 202 clutching a remote controller 200. Remote controller 200 is programmed to control bird decoy body 20. Remote controller 200 transmits control signals to remote control receiver 60 (shown in FIG. 6). User 202 manipulates remote controller 200, which transmits control signals to remote control receiver 60 causing bird decoy body 20 to move along a surface of water, to shake producing bird-attracting movement, and to produce bird-attracting noises.

I hereby claim:

1. A game call holder, comprising:
   a housing disposing a shaker motor and a power source;
      wherein the housing is bird shaped;
      wherein the housing floats upon a body of water;
   a shaker motor, a lift wheel, and a lifter,
      wherein the shaker motor is coupled to the lift wheel,
      wherein the lift wheel is coupled to the lifter, wherein movement of the lift wheel in a circular path causes the lifter to move vertically moving the game call holder vertically upon the body of water, and
      wherein the lifter further comprises an embedded magnet, wherein the shaker motor detects the position of the embedded magnet;
   a remote control selectively activating the shaker motor;
      wherein the shaker motor moves the game call holder up and down upon the body of water;
   spring disposed with the housing;
   a mechanical can call disposed with the housing;
      wherein the spring moves the mechanical can call up and down in an arc within the housing;
      wherein the mechanical can call includes an internal mechanism that produces a noise that attracts a bird when said mechanical can call is moved up and down in an arc relative to the housing.

2. The game call holder of claim 1 wherein the spring is a compression spring.

3. The game call holder of claim 1 wherein the mechanical can call is cylindrical in shape.

4. The game call holder of claim 1 wherein the power source comprises a battery disposed within the housing.

5. The game call holder of claim 4 wherein operation of the shaker motor causes the housing to shake simulating the movement of a duck, wild turkey, goose, or pheasant upon the body of water.

6. The game call holder of claim 1 wherein the mechanical can call produces a noise that attracts a duck, wild turkey, goose, or pheasant.

7. The game call holder of claim 1, further comprising a lid formed onto the housing, wherein the lid may be opened to allow a user access to the shaker motor, the spring, and the mechanical can call.

* * * * *